United States Patent
Drumm et al.

(10) Patent No.: US 8,251,097 B2
(45) Date of Patent: Aug. 28, 2012

(54) SLIDING VALVE

(75) Inventors: Stefan A. Drumm, Saulheim (DE); Lothar Schiel, Hofheim (DE)

(73) Assignee: Continental Teves AG & Co. oHG (DE)

( * ) Notice: Subject to any disclaimer, the term of this patent is extended or adjusted under 35 U.S.C. 154(b) by 349 days.

(21) Appl. No.: 12/681,210

(22) PCT Filed: Sep. 23, 2008

(86) PCT No.: PCT/EP2008/062682
§ 371 (c)(1), (2), (4) Date: Apr. 1, 2010

(87) PCT Pub. No.: WO2009/047115
PCT Pub. Date: Apr. 16, 2009

(65) Prior Publication Data
US 2010/0243941 A1 Sep. 30, 2010

(30) Foreign Application Priority Data

Oct. 2, 2007 (DE) .......................... 10 2007 047 201
Aug. 16, 2008 (DE) .......................... 10 2008 037 981

(51) Int. Cl.
*F15B 13/04* (2006.01)
(52) U.S. Cl. .............................. 137/625.68; 137/625.69
(58) Field of Classification Search ............ 137/625.68, 137/625.69
See application file for complete search history.

(56) References Cited

U.S. PATENT DOCUMENTS

| | | | | |
|---|---|---|---|---|
| 1,825,290 A | * | 9/1931 | Stevens | 137/625.68 |
| 2,893,428 A | * | 7/1959 | Collins | 137/625.68 |
| 3,318,333 A | * | 5/1967 | McCollum et al. | 137/625.69 |
| 3,910,466 A | * | 10/1975 | Collar | 137/625.68 |
| 3,927,830 A | * | 12/1975 | Briski | 137/625.68 |
| 4,491,153 A | * | 1/1985 | Bartholomaus | 137/625.68 |
| 6,152,179 A | * | 11/2000 | Buttner et al. | 137/625.68 |
| 6,779,558 B1 | | 8/2004 | Bruck et al. | |
| 6,953,055 B2 | | 10/2005 | Kulmann et al. | |

FOREIGN PATENT DOCUMENTS

| | | |
|---|---|---|
| DE | 70 30 280 | 8/1970 |
| DE | 102 13 258 | 8/2003 |
| DE | 20 2005 014 866 | 6/2005 |
| EP | 1 226 478 | 7/2002 |

OTHER PUBLICATIONS

German Search Report for DE 10 2008 037 981.6 dated Jan. 15, 2009.

* cited by examiner

*Primary Examiner* — John Rivell
(74) *Attorney, Agent, or Firm* — RatnerPrestia

(57) ABSTRACT

A sliding valve having a valve slider that can be axially displaced relative to the valve sleeve in order to determine the size of variable passage cross-sections and for establishing a pressurization connection between a high-pressure connection and a working connection and a pressure-reducing connection between the working connection and a low-pressure connection, in that control edges running in the circumferential direction are configured on the outer circumference of the valve slider, which interact with the control edges of the valve sleeve. The control edges of the valve sleeve are configured as edges extending in the circumferential direction relative to the symmetry axis, which are a component of a lateral face of the valve sleeve.

12 Claims, 1 Drawing Sheet

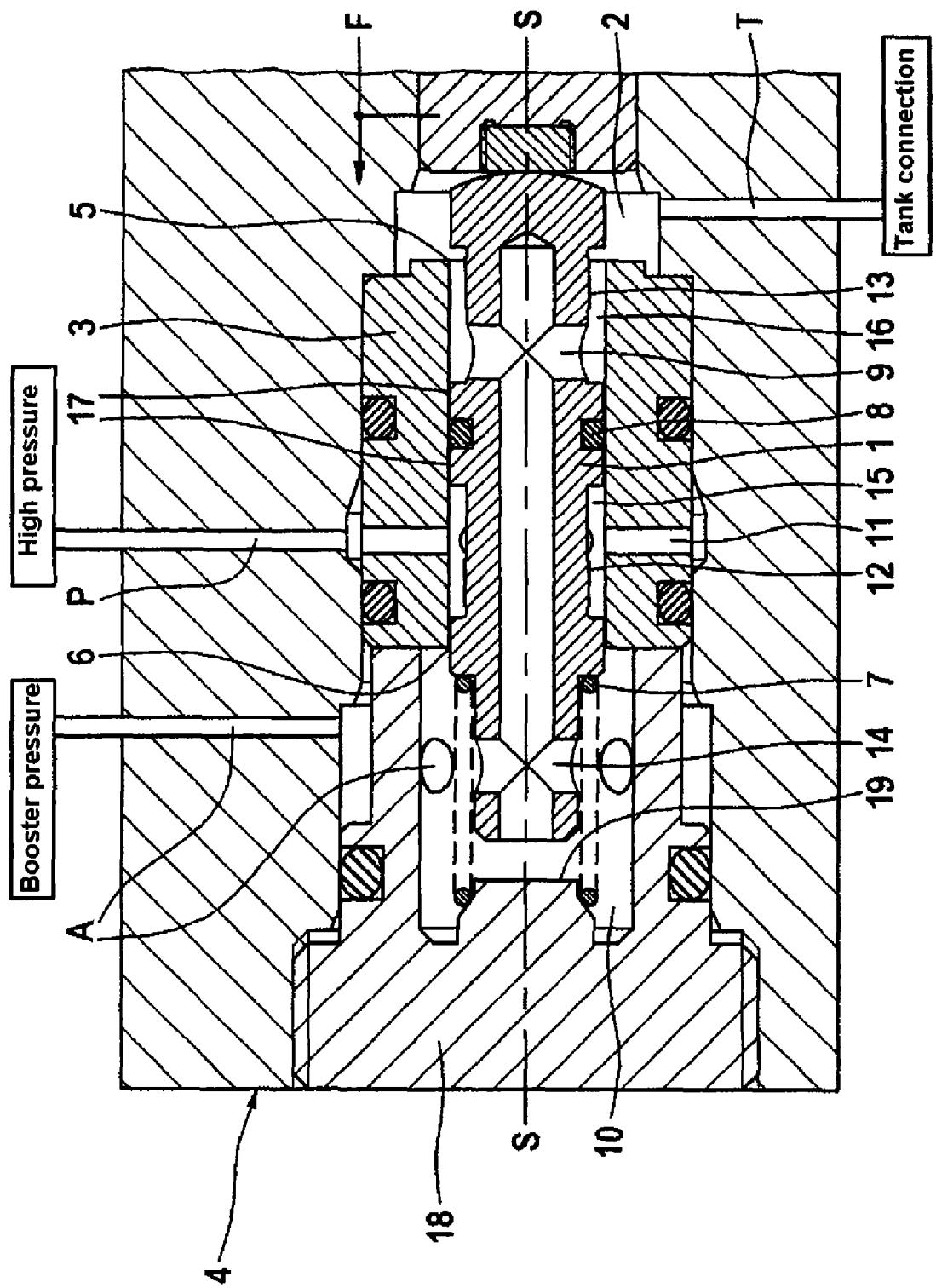

SLIDING VALVE

CROSS REFERENCE TO RELATED APPLICATIONS

This application is the U.S. national phase application of PCT International Application No. PCT/EP2008/062682, filed Sep. 23, 2008, which claims priority to German Patent Application No. DE 10 2007 047 201.5, filed Oct. 2, 2007, and German Patent Application No. DE 10 2008 037 981.6, filed Aug. 16, 2008, the contents of such applications being incorporated herein by reference.

FIELD OF THE INVENTION

The invention relates to a sliding valve for regulating pressure in a hydraulic circuit.

BACKGROUND OF THE INVENTION

A sliding valve of this type for regulating the pressure in a hydraulic circuit is already known from EP 1226478 B1, which is incorporated herein by reference, of which the partially hollow-cylindrical valve slide guided in a sleeve has a plurality of peripheral edges which, in cooperation with a plurality of transverse bores in the sleeve, form variable hydraulic passage cross sections for the build-up of pressure and for the breakdown of pressure. One disadvantage, in this case, is that the flow cannot pass through those regions of the peripheral valve slide edges which are concealed by the webs between the bores of the sleeve, and therefore a relatively large stroke of the valve slide is required in order to release a large passage cross section. A further disadvantage arises due to the fact that the pressure medium, when it flows through the variable pressure build-up passage cross section, experiences flow velocities, the axial component of which is directed opposite to the flow direction prevailing further downstream. This reversal in flow direction may lead to undesirable turbulence and to flow noises.

SUMMARY OF THE INVENTION

An object of the present invention, therefore, is to improve a sliding valve of the type specified, in such a way that as large a hydraulic passage area as possible can be released even with a small valve slide stroke.

According to one aspect of the invention, this object is achieved by a sliding valve, arranged in a housing, in which hydraulic connections (A, T, P) are formed, for regulating the hydraulic pressure at a working connection (A) to values between a pressure at a low-pressure connection (T) and a pressure at a high-pressure connection (P), with a valve sleeve, the main bore of which defines an axis of symmetry (S) and a surface area, with a rotationally symmetrical valve slide which is received so as to be axially movable in the main bore and the displacement position of which is influenced by a valve activation force (F) acting upon the valve slide and also by a pressure force acting upon an end face of the valve slide and exerted by the pressure in the working connection and by the force of a restoring spring, the position of the valve slide in the direction of the axis of symmetry (S) in relation to the valve sleeve fixing the size of variable passage cross sections both of a pressure build-up connection between the high-pressure connection (P) and the working connection (A) and of a pressure breakdown connection between the working connection (A) and the low-pressure connection (T), in that control edges are formed which extend peripherally in the circumferential direction on the outer circumference of the valve slide and which cooperate with control edges of the valve sleeve, characterized in that the control edges of the valve sleeve are designed as edges which extend peripherally in the circumferential direction with respect to the axis of symmetry (S) and which are an integral part of a surface area of the valve sleeve.

Further features and advantages of the invention may be gathered below from the description of an exemplary embodiment with reference to a drawing.

BRIEF DESCRIPTION OF THE DRAWINGS

The invention is best understood from the following detailed description when read in connection with the accompanying drawing. Included in the drawing is the following FIGURE:

FIG. 1 depicts a cross-sectional view of a valve assembly.

DETAILED DESCRIPTION OF THE PREFERRED EMBODIMENTS

The basic set-up and the functioning of the sliding valve according to aspects of the invention are now explained with reference to FIG. 1.

The sliding valve, depicted in longitudinal section, serves for regulating the hydraulic pressure at a working connection A to values between a low pressure and a high pressure, for which purpose an axially symmetrical valve slide 1 is received so as to be linearly movable in a valve sleeve 3. The valve sleeve 3, which advantageously has a very short build, is fitted, pressure-tight, into a housing 4, with the result that hydraulic chambers are delimited which are connected to the low-pressure and high-pressure connections T, P and to the working connection A. The pressure-tight connection of the valve sleeve 3 and housing 4 may be implemented in a known way by means of static seals, but a press connection is preferred, for example the pressing of a steel sleeve into an aluminum housing, which requires no further sealing measures. The pressure connections T, P, A are preferably implemented by means of bores which are simple to produce.

When the valve slide 1 is in the first position (pressure breakdown position), depicted in the example, the working connection A is connected to the low-pressure connection T via the valve slide 1, drilled hollow on one side, and via a radial bore 9 arranged in the vicinity of the closed end of the valve slide 1. As also explained below, in a second position (holding position) of the valve slide 1 the working connection A is isolated from the two connections P, T, and, in a third position (pressure build-up position) of the valve slide 1, the working connection A is connected to the high-pressure connection P.

When the valve slide 1 is actuated under a valve activation force F acting upon the valve slide 1 to the left in the FIGURE, these three positions of the valve slide 1 are run through in ascending order, the shut-off and release of the fluid connections between the pressure connections T, P, A advantageously taking place by means of two low-pressure and high-pressure control edges 5, 6 extending peripherally on the end faces of the valve sleeve 3.

In the cited prior art, control edges in the valve slide which extend peripherally over the surface area cooperate with radial passage apertures in the valve sleeve. In this case, as a consequence of the principle adopted, an opening of the hydraulic passage cannot take place over the entire length of the slide control edge, because the passage apertures in the valve sleeve are delimited by webs. It is therefore proposed that, in the valve sleeve 3, control edges 5, 6 for the pressure build-up and breakdown are used which cooperate with the slide control edges in such a way that the release of the hydraulic passage cross section takes place uniformly over the entire circumference of the guidance gap between the valve slide 1 and valve sleeve 3. According to aspects of the invention, therefore, the control edges 5, 6 of the valve sleeve 3 are designed as edges which extend peripherally in the circumferential direction with respect to the axis of symmetry S and which form an integral part of the surface area of the valve sleeve 3.

In the cited prior art, a control edge over which the flow can pass over the entire circumference and which is located in the valve sleeve could be improved with the aid of internal grooves. In this case, however, a manufacturing problem arises, because these internal grooves can be produced only at high outlay. According to aspects of the invention, this manufacturing problem is avoided in a surprisingly simple way in that the control edges 5, 6 of the valve sleeve 3 are shifted to the ends of the main bore, designed as a through-bore, of the valve sleeve 3. There is therefore no longer any need to manufacture internal grooves, but, instead, the control edges 5, 6 can be machined in an easily accessible way at the ends of the valve sleeve 3.

The valve sleeve 3 can be produced particularly cost-effectively when simply the two ends are surface-ground in a particularly simple manufacturing process in order to form the control edges 5, 6.

The highest pressure medium velocities naturally arise during the flow around control edges. To avoid flow noises, it is beneficial to conduct the turbulences in this case occurring into as large a hydraulic space as possible for the purpose of flow calming. In the cited prior art, the flow from P to A is disadvantageously conducted inward into a relatively small space, this additionally entailing a reversal of the main flow direction. It is therefore proposed to cause the pressure medium stream from P to A to flow from the inside outward via the pressure build-up control edges. For this purpose, according to aspects of the invention, the high pressure is conducted from the connection P through the valve sleeve 3 into an external groove of the valve slide 1 and is thus present at the pressure build-up control edges "from inside". For this purpose, a peripheral groove 12 on the valve slide 1, together with the surface area of the valve sleeve 3, forms a hydraulic annular chamber 15 which is connected permanently to the high-pressure connection P via a radial bore 11 in the valve sleeve 3.

Through-flow from the inside outward is also expedient during flow over the pressure breakdown control edges. However, this is also already the case in the prior art, except that, there, the liquid jet is not immediately braked in a large hydraulic space, but first has to flow into radial bores in the valve sleeve. A peripheral groove 13 in the valve slide 1, together with the surface area of the valve sleeve 3, therefore forms a hydraulic annular chamber 16 which is connected permanently to the working connection A via a radial bore 9 in the valve slide 1.

In the sliding valve, the volume flow of the in each case closed control edge is reduced by the sealing action of a gap to an unavoidable leakage volume flow. During operation, as intended, these gaps are releasable, and any suspended particles which are contained in the pressure medium and may settle in these gaps are therefore washed away again during pressure regulation. Furthermore, there is in addition, between the valve slide 1 and the valve sleeve 3, a non-releasable sealing gap which prevents an undesirable hydraulic connection of the high-pressure connection P to the low-pressure connection T. To avoid the settling of suspended particles, a sealing ring 8 is provided here, which reduces the gap flow to virtually zero and thus prevents dirt particles from being washed in. The elastomeric sealing ring 8 is preferably inserted in a web 17, extending peripherally with respect to the axis of symmetry S, of the valve slide 1, specifically in a groove arranged between the two annular chambers 15, 16, so that a hydraulic separation of the annular chambers 15, 16 is ensured.

A control edge which is free around the entire circumference, naturally, can no longer guide the slide. For this purpose, however, there is a simple solution, although this is not illustrated explicitly in FIG. 1, whereby the valve slide 1 has within the annular chambers 15, 16 a plurality of radial projections which, for the purpose of guiding the valve slide 1 radially within the axial bore of the valve sleeve 3, project as far as the surface area of the latter, the projections being spaced apart in the circumferential direction from one another and in the axial direction from the peripheral webs 17 delimiting the annular chambers 15, 16, in such a way that the hydraulic through-flow is not impaired.

In contrast to the cited prior art, in which the peripheral edges on the valve slide cooperate with radial through-flow bores in the housing, the partially hollow piston shank of the valve slide 1 now requires only one radial through-flow bore 9 which cooperates with the low-pressure control edge 5 extending peripherally on the valve sleeve 3, in order, in the depicted pressure breakdown position of the valve slide 1 (first position), to effect pressure equalization between the working connection A and the low-pressure connection T via the hollow piston shank, while at the same time, in the depicted pressure breakdown position of the valve slide 1, the high-pressure control edge 6 is concealed by the surface area of the valve slide 1, with the result that the high-pressure connection P is separated from the working connection A. The radial bore 9 connects the axial bore in the valve slide permanently to an annular chamber 16 formed on the outside of the valve slide 1. This results, depending on the slide movement, in a variable passage cross section as variable connection from the annular chamber 16 to the low-pressure connection T, which passage cross section can likewise be shut off by means of a displacement of the valve slide 1 in relation to the valve sleeve 3. In the shut-off state, the outflow of pressure medium from the working connection A to the low-pressure connection T is prevented, with the exception of the leakage unavoidable in the case of a gap seal.

A displacement state of the valve slide 1 is consequently reached, in which, apart from leakage volume flows, a pressure medium exchange is not possible either via the low-pressure control edge 5 or via the high-pressure control edge 6. As a result of this positive overlap, as it is known, in the spacing of the control edges on the valve slide 1, as compared with the spacing of the control edges on the valve sleeve 3, a hydraulic short circuit, that is to say an undesirable direct hydraulic flow connection from the high-pressure connection P to the low-pressure connection T, is prevented.

In the event of a further displacement of the valve slide 1 in relation to the valve sleeve 3, the connection A-T remains closed, while the connection P-A is opened, in that the high-pressure control edge 6 formed in the valve sleeve 3 and the high-pressure control edge formed in the valve slide 1 release a passage orifice extending over the entire circumference of these control edges.

The low-pressure control edge 5 and the high-pressure control edge 6 are preferably formed at the opposite ends of the cylindrical valve sleeve 3 and can therefore be produced particularly simply and cost-effectively by the surface grinding of the cylinder-bottom and cover faces.

This results, because the low-pressure and high-pressure control edges 5, 6 are formed, as explained, at the ends of the valve sleeve 3, in a maximized annular flow cross section in the open position at each of the two control edges 5, 6. In terms of the valve slide stroke, therefore, a substantially larger passage area is released, as compared with the prior art, so that, by means of the valve according to aspects of the invention, a highly dynamic hydraulic regulating behavior can be achieved.

It follows from this that there is a maximized annular flow cross section which has a highly dynamic regulating behavior and which is immediately released completely independently of the size of the working stroke of the valve slide 1.

Furthermore, it may be gathered from FIG. 1 that a valve spring 7 is supported on that end face of the housing 4 into which the working connection A issues, said valve spring basically positioning the valve slide 1, counter to the valve activation force F in the non-actuated position in which the overflow of the pressure medium is ensured via the low-pressure control edge 5 for pressure equalization between the working connection A and the low-pressure connection T.

Under a valve activation force F directed to the left, the closing of the low-pressure control edge 5 by the surface area of the valve slide 1 first takes place before a release of the high-pressure control edge 6 by the valve slide 1 can take place in order to allow the overflow of the high-pressure control edge 6 from the high-pressure connection P along the narrowed portion of the surface area of the valve slide 1 to the working connection A. The overflow between the valve slide 1 and the valve sleeve 3 takes place radially and to some extent tangentially from the inside outward, while, via the radial issue of the high-pressure connection P, the pressure medium is first deflected axially in the narrowed portion along a circumferential groove of the valve slide 1, before it can flow out circularly between the valve slide 1 and the high-pressure control edge 6.

The length of the valve sleeve 3 is determined by the axial spacing between the low-pressure and the high-pressure control edges 5, 6, with the result that the valve slide 1 is guided solely between the low-pressure and the high-pressure control edges 5, 6 in the valve sleeve 3. This has the effect, even in the case of a very narrow slide fit, of an easy movability of the valve slide 1 which, moreover, is guided, free of transverse forces, in the valve sleeve 3 with precision.

The valve sleeve 3 is delimited on both sides of the low-pressure and the high-pressure control edges 5, 6 by chambers 2, 10 in the housing 4 which are of any desired selectable size, as a result of which, the pressure medium, when it flows over the abovementioned two control edges 5, 6, flows in each case into one or the other relatively wide chamber 2, 10, with the result that the high flow velocities occurring during the flow over the edges are broken down, thus causing a noise-preventing flow calming, before the pressure medium arrives at the working-pressure or low-pressure connection A, T.

In FIG. 1, therefore, the left chamber 10 is delimited axially by that portion of the housing 4 which is provided with the working connection A and of the high-pressure control edge 6 at the left end portion of the valve sleeve 3, while the right chamber 2 extends axially from the low-pressure control edge 5 at the right end portion of the valve sleeve 3 as far as the wall of the housing 4.

The slide valve hereby presented is therefore distinguished by a small, functionally optimized and cost-effective form of construction.

The invention claimed is:

1. A sliding valve, arranged in a housing, in which hydraulic connections (A, T, P) are formed, for regulating a hydraulic pressure at a working connection (A) to values between a pressure at a low-pressure connection (T) and a pressure at a high-pressure connection (P), comprising:

a valve sleeve, a main bore of which defines an axis of symmetry (S) and a surface area, a rotationally symmetrical valve slide which is received so as to be axially movable in the main bore and a displacement position of which is influenced by a valve activation force (F) acting upon the valve slide and also by a pressure force acting upon an end face of the valve slide and exerted by the pressure in the working connection and by a force of a restoring spring, wherein the position of the valve slide in a direction of the axis of symmetry (S) in relation to the valve sleeve fixes a size of variable passage cross sections both of a pressure build-up connection between the high-pressure connection (P) and the working connection (A) and a size of a pressure breakdown connection between the working connection (A) and the low-pressure connection (T), wherein control edges are formed which extend peripherally in a circumferential direction on an outer circumference of the valve slide and which cooperate with control edges of the valve sleeve, wherein the control edges of the valve sleeve extend peripherally in the circumferential direction with respect to the axis of symmetry (S) and which are an integral part of a surface area of the valve sleeve.

2. The sliding valve as claimed in claim 1, wherein the main bore of the valve sleeve is a through-bore, and the control edges are formed by issues of the main bore into the end faces of the valve sleeve.

3. The sliding valve as claimed in claim 2, wherein the end faces of the valve sleeve are planar faces that are oriented perpendicular to the axis of symmetry (S).

4. The sliding valve as claimed in claim 1, wherein a peripheral groove in the valve slide, together with the surface area of the valve sleeve, forms a hydraulic annular chamber which is connected permanently to the high-pressure connection (P) via a radial bore in the valve.

5. The sliding valve as claimed in claim 4, wherein a peripheral groove in the valve slide, together with the surface area of the valve sleeve, forms a hydraulic annular chamber which is connected permanently to the working connection (A) via a radial bore in the valve slide.

6. The sliding valve as claimed claim 5, wherein a groove is formed in a web, extending peripherally with respect to the axis of symmetry (S), of the valve slide between the two annular chambers and receives an elastomeric sealing ring for hydraulic separation of the annular chambers.

7. The sliding valve as claimed in claim 5, wherein the valve slide has within the annular chambers a plurality of radial projections which, for a purpose of guiding the valve slide radially within the main bore of the valve sleeve, project as far as the surface area of the valve sleeve, the projections beings spaced apart in the circumferential direction from one another and in the axial direction from the peripheral webs delimiting the annular chambers, in such a way that a hydraulic through-flow is not impaired.

8. The sliding valve as claimed in claim 1, wherein the valve activation force (F) is transmitted to the valve slide via a mechanical contact force, at least one surface of two bodies touching one another for force transmission.

9. The sliding valve as claimed in claim 1, wherein the valve slide and the valve sleeve are introduced as a preassembled structural unit into a stepped bore which is located in the housing and which is closed on a working-pressure side by a cover fixed to the housing.

10. The sliding valve as claimed in claim 9, wherein the restoring spring is a compression spring that is supported on the cover fixed to the housing and on the valve slide.

11. The sliding valve as claimed in claim 9, wherein a stop for limiting a travel distance of the valve slide is formed in the cover fixed to the housing.

12. The sliding valve as claimed in claim 11, wherein to maintain a hydraulic flow in a stop position of the valve slide, the valve slide is provided with at least one transverse bore or with a radial fluid passage aperture that is equivalent to a transverse bore.

* * * * *